(12) United States Patent  (10) Patent No.: US 9,176,659 B2
Park et al.  (45) Date of Patent: Nov. 3, 2015

(54) METHOD AND APPARATUS FOR INPUTTING CHARACTERS IN A MOBILE COMMUNICATION TERMINAL

(75) Inventors: Won Joo Park, Gwacheon-si (KR); Yu Ran Kim, Seoul (KR); Mi Jung Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1498 days.

(21) Appl. No.: 12/102,495

(22) Filed: Apr. 14, 2008

(65) Prior Publication Data

US 2008/0284744 A1 Nov. 20, 2008

(30) Foreign Application Priority Data

May 14, 2007 (KR) .............................. 2007-0046382

(51) Int. Cl.
G06F 3/048 (2013.01)
G06F 3/0486 (2013.01)
G06F 3/0488 (2013.01)

(52) U.S. Cl.
CPC .......... G06F 3/0486 (2013.01); G06F 3/04886 (2013.01)

(58) Field of Classification Search
CPC .................. G06F 3/04886; G06F 2203/04805
USPC ....................................................... 345/156
See application file for complete search history.

(56) References Cited

U.S. PATENT DOCUMENTS

| | | | |
|---|---|---|---|
| 5,784,060 A * | 7/1998 | Bertram et al. ............... | 715/840 |
| 5,812,117 A | 9/1998 | Moon | |
| 6,016,142 A * | 1/2000 | Chang et al. .................. | 715/763 |
| 6,046,732 A * | 4/2000 | Nishimoto .................... | 345/168 |
| 6,073,036 A * | 6/2000 | Heikkinen et al. .......... | 455/550.1 |
| 6,094,197 A * | 7/2000 | Buxton et al. ................ | 715/863 |
| 6,169,538 B1 * | 1/2001 | Nowlan et al. ................ | 345/168 |
| 6,211,856 B1 | 4/2001 | Choi et al. | |
| 6,466,237 B1 * | 10/2002 | Miyao et al. .................. | 715/838 |
| 6,614,422 B1 * | 9/2003 | Rafii et al. .................... | 345/168 |

(Continued)

FOREIGN PATENT DOCUMENTS

| | | | | |
|---|---|---|---|---|
| DE | 10158226 A1 * | 5/2003 | ................ | G06T 3/40 |
| DE | 103 10 794 A1 | 9/2004 | | |

(Continued)

OTHER PUBLICATIONS

Author: Mathieu Raynal, Philippe Truillet Title: "The Fisheye Keyboard" Date: Apr. 21, 2006 Publisher: IHM 2006, Montréal, Pages: p. 289-290.*

*Primary Examiner* — Patrick Riegler
*Assistant Examiner* — Phoebe Pan
(74) *Attorney, Agent, or Firm* — Jefferson IP Law, LLP (57) ABSTRACT

A method and apparatus which efficiently inputs characters through a touch screen in a mobile communication terminal is provided. The method, for inputting characters through a touch screen in a mobile communication terminal, includes displaying a virtual keyboard including a plurality of keyboard keys on the touch screen in response to a character input request, inputting an input signal through the touch screen; and inputting a corresponding character, if the input signal is a click signal. If the input signal is a drag signal, the virtual keyboard is moved. Therefore, the character input method and apparatus display a virtual keyboard that is greater than the touch screen and thus reduce the user character input errors.

18 Claims, 7 Drawing Sheets

(56) References Cited

U.S. PATENT DOCUMENTS

| | | | |
|---|---|---|---|
| 6,809,725 B1 * | 10/2004 | Zhang | 345/171 |
| 6,885,318 B2 | 4/2005 | Bickerton | |
| 7,199,786 B2 * | 4/2007 | Suraqui | 345/168 |
| 7,336,263 B2 * | 2/2008 | Valikangas | 345/173 |
| 7,434,177 B1 * | 10/2008 | Ording et al. | 715/862 |
| 7,522,087 B2 * | 4/2009 | Shibamiya et al. | 341/176 |
| 8,719,723 B2 * | 5/2014 | Rath et al. | 715/773 |
| 8,869,059 B2 * | 10/2014 | Aono et al. | 715/773 |
| 2002/0158921 A1 * | 10/2002 | Silverstein | 345/864 |
| 2004/0100479 A1 | 5/2004 | Nakano et al. | |
| 2004/0119751 A1 | 6/2004 | Yoshimi et al. | |
| 2004/0135823 A1 * | 7/2004 | Wingett et al. | 345/856 |
| 2004/0183834 A1 * | 9/2004 | Chermesino | 345/773 |
| 2005/0070324 A1 * | 3/2005 | Chadha | 455/550.1 |
| 2005/0248525 A1 * | 11/2005 | Asai | 345/156 |
| 2005/0289482 A1 * | 12/2005 | Anthony et al. | 715/851 |
| 2006/0033724 A1 * | 2/2006 | Chaudhri et al. | 345/173 |
| 2006/0161846 A1 * | 7/2006 | Van Leeuwen | 715/702 |
| 2006/0209040 A1 * | 9/2006 | Garside et al. | 345/173 |
| 2007/0046641 A1 * | 3/2007 | Lim | 345/173 |
| 2007/0171210 A1 * | 7/2007 | Chaudhri et al. | 345/173 |
| 2008/0096610 A1 * | 4/2008 | Shin et al. | 455/566 |
| 2009/0040184 A9 * | 2/2009 | Pu et al. | 345/171 |
| 2009/0153468 A1 * | 6/2009 | Ong et al. | 345/156 |
| 2009/0204920 A1 * | 8/2009 | Beverley et al. | 715/768 |
| 2009/0228841 A1 * | 9/2009 | Hildreth | 715/863 |
| 2010/0026723 A1 * | 2/2010 | Nishihara et al. | 345/671 |
| 2011/0078567 A1 * | 3/2011 | Kim et al. | 715/702 |
| 2011/0163963 A1 * | 7/2011 | Skarine et al. | 345/173 |
| 2011/0221693 A1 * | 9/2011 | Miyazaki | 345/173 |
| 2011/0254865 A1 * | 10/2011 | Yee et al. | 345/661 |
| 2011/0285657 A1 * | 11/2011 | Shimotani et al. | 345/173 |
| 2011/0298735 A1 * | 12/2011 | Kamaeguchi et al. | 345/173 |

FOREIGN PATENT DOCUMENTS

| | | |
|---|---|---|
| EP | 0 880 090 A2 | 4/1998 |
| EP | 1 416 368 A2 | 5/2004 |
| EP | 1 548 552 A1 | 6/2005 |
| EP | 1 703 363 A2 | 9/2006 |
| GB | 2 425 700 A | 11/2006 |
| JP | 2003-280796 A | 10/2003 |
| JP | 2005-92441 A | 4/2005 |
| KR | 19990054343 B1 | 7/1999 |
| KR | 1020030088374 A | 11/2003 |
| KR | 10-2004-0070315 A | 8/2004 |
| KR | 10-2005-0040508 A | 5/2005 |
| KR | 10-2006-0119527 A | 11/2006 |
| WO | 2007/014064 A2 | 2/2007 |

* cited by examiner

METHOD AND APPARATUS FOR INPUTTING CHARACTERS IN A MOBILE COMMUNICATION TERMINAL

PRIORITY

This application claims the benefit under 35 U.S.C. §119 (a) of a Korean patent application filed on May 14, 2007 in the Korean Intellectual Property Office and assigned Serial No. 2007-0046382, the entire disclosure of which is hereby incorporated by reference.

BACKGROUND OF THE INVENTION

1. Field of the Invention

The present invention relates to a mobile communication terminal. More particularly, the present invention relates to a method and apparatus that efficiently inputs characters through a touch screen in a mobile communication terminal.

2. Description of the Related Art

In general, a mobile communication terminal is referred as a terminal that can provide personal portability and various functions, such as wireless communications using an application program. The mobile communication terminal includes personal mobile communication terminals, personal digital assistants (PDA's), smart phones, international mobile telecommunication 2000 (IMT-2000) terminals, wireless LAN terminals and the like.

As technological advances have been made in the development of mobile communication terminals, they become now smaller and lighter and have additional functions, such as an MP3 player function, a digital camera function, and a GPS navigator function. That is, mobile communication terminals now provide a composite communication terminal and thus have become a must-have item for many people.

Recent mobile communication terminals (e.g., PDA's) have a touch screen that allows users to input various signals. The touch screen is configured to include a display panel (e.g., an LCD) and a touch panel mounted thereon. The user touches an icon displayed on the touch screen using their finger or a stylus pen to execute a corresponding application. The user can also input characters by touching the keyboard which is displayed on a certain area of the touch screen.

However, conventional mobile communication terminals have various disadvantages including the fact that, when a user inputs characters through the touch screen, due to limitations of the touch screen size the keyboard keys are displayed in relatively small size through a virtual keyboard, and accordingly the user makes frequent touch errors when inputting characters, so that the user must correct their errors and input the characters again. That is, the user must correct errors by repeating the process of inputting characters though the touch screen and this repetitive process wastes time.

SUMMARY OF THE INVENTION

An aspect of the present invention is to address the above-mentioned problems and/or disadvantages and to provide at least the advantages described below. Accordingly, an aspect of the present invention is to provide a method and apparatus that can allow the user to easily input characters through the touch screen of a mobile communication terminal and therefore reduce the rate of touch errors when inputting the characters.

In accordance with an aspect of the present invention, a method for inputting characters through a touch screen in a mobile communication terminal is provided. The method includes displaying a virtual keyboard including a plurality of keyboard keys on the touch screen in response to a character input request, inputting an input signal through the touch screen, and inputting a corresponding character, if the input signal is a click signal. If the input signal is a drag signal, the virtual keyboard is moved.

In accordance with another aspect of the present invention, an apparatus for inputting characters in a mobile communication terminal having a touch screen is provided. The apparatus includes a key input determining unit for inputting an input signal through the touch screen and for determining whether the input signal is a character input signal for inputting characters or a virtual keyboard movement signal for moving the virtual keyboard, and a keyboard processing unit for displaying the virtual keyboard on the touch screen in response to a character input request, and for inputting characters or moving the virtual keyboard according to the determination of the key input determining unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects, features, and advantages of certain exemplary embodiments of the present invention will become more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention.

The terms or words described in the present description and the claims should not be limited by a general or lexical meaning, but instead should be analyzed as a meaning and a concept through which the inventor defines and describes the present invention with the utmost effort, to comply with the idea of the present invention. Therefore, one skilled in the art will understand that the embodiments disclosed in the description and configurations illustrated in the drawings are only exemplary embodiments. There may be various modifications, alterations, and equivalents thereof to replace the exemplary embodiments at the time of filing this application.

Although the terminal according to the present invention is described based on a mobile communication terminal, it should be understood that the present invention is not restricted thereto. Rather, the terminal according to the present invention is referred to as a terminal that can receive broadcasts. It will be appreciated that the terminal can be applied to all information communication devices, multimedia devices, and their applications, such as mobile phones, digital multimedia broadcasting (DBM) receivers, digital video broadcasting-handheld (DVB-H) receivers, wired/wireless phones, 3rd generation terminals (e.g., IMT-2000 terminal), wideband code division multiple access (WCDMA) terminals, universal mobile telecommunication service (UMTS) terminals, global system for mobile communication (GSM) terminals, and general packet radio system (GPRS) terminals.

Also, descriptions of well-known functions and configurations are omitted for clarity and conciseness.

Although the drawings represent exemplary embodiments of the invention, the drawings are not necessarily to scale and certain features may be exaggerated or omitted in order to better illustrate and explain the present invention.

In exemplary embodiments of the present invention, the touch screen is referred to as a display unit having a touch input unit (e.g., a touch panel) attached thereto. An input signal is input through the touch screen in such a way that the touch pad attached to the display unit is subject to physical force and thus a touch event occurs in the touch input unit.

Figure 1:
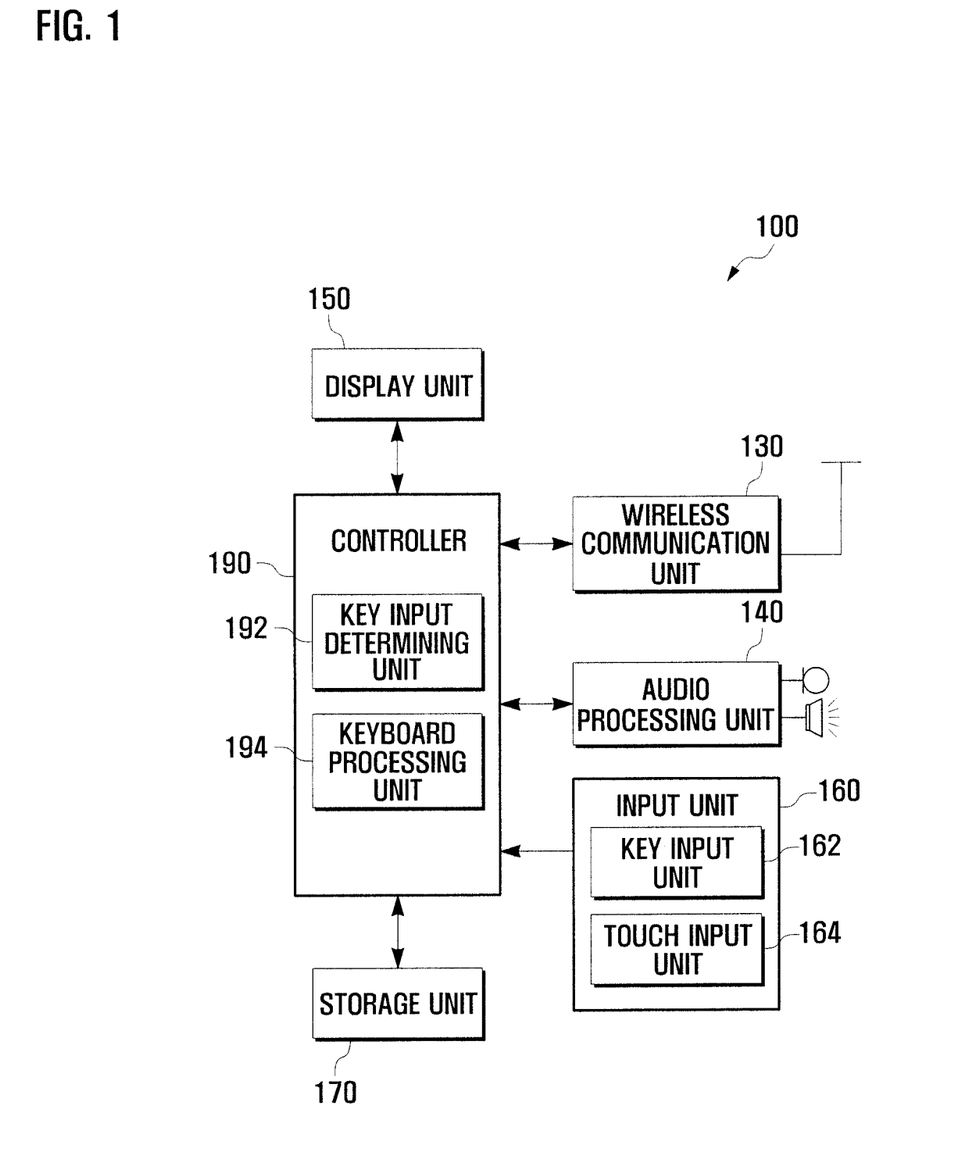
FIG. 1 is a schematic block diagram illustrating a mobile communication terminal according to an exemplary embodiment of the present invention.

FIG. 1 is a schematic block diagram illustrating a mobile communication terminal according to an exemplary embodiment of the present invention.

Referring to FIG. 1, the mobile communication terminal 100 includes a wireless communication unit 130, an audio processing unit 140, an input unit 160, a display unit 150, a storage unit 170, and a controller 190.

The wireless communication unit 130 serves to transmit/receive data through wireless communication of the mobile communication terminal 100. The wireless communication unit 130 is configured to include an RF transmitter for up-converting a frequency of transmitted signals and amplifying the transmitted signals, and an RF receiver for low-noise amplifying a received RF signal and down-converting a frequency of the received RF signal. The wireless communication unit 130 receives data through an RF channel and outputs data to the controller 190. Also, the wireless communication unit 130 transmits the data output from the controller 190 through the RF channel.

The audio processing unit 140 includes a codec (coder & decoder). The codec may be configured to include a data codec that processes packet data and an audio codec that processes audio signals, such as voice signals. The audio processing unit 140 converts the digital audio data, received from the controller 190 through the wireless communication unit 130, into an analog audio signal to be output through a speaker using the audio codec. Furthermore, the audio processing unit 140 converts an analog audio signal, input through a microphone, into digital audio data to be output to the controller 190 using the audio codec.

The display unit 150 displays a menu, user data input by a user, function setting information, and a variety of information included in the mobile communication terminal 100. The display unit 150 may be implemented by a Liquid Crystal Display (LCD). In this case, the display unit 150 may be configured to include an LCD controller for controlling an LCD, a video memory for storing video data, and electrical parts of the LCD.

As an exemplary implementation, the display unit 150, according to an embodiment of the present invention, includes a Liquid Crystal (LC) panel and a backlight. The LC panel displays images in such a way that the light transmission of the LC cell is controlled, in which the LC cell is composed of two glass plates between which LC is injected. The LC cell controls the amount of transmitted light in response to a video signal (i.e., pixel signal). The backlight projects light on the LC panel. Therefore, the user can view the screen as the light is transmitted through the LC panel. In the meantime, if the display unit 150 according to an exemplary embodiment of the present invention is implemented by a touch screen, the display unit 150 serves part of or all of the functions of the input unit 160.

The input unit 160 inputs a user's operational signal for controlling the mobile communication terminal 100 and outputs the signal to the controller 190. To this end, the input unit 160 of an exemplary embodiment of the present invention includes a key input unit 162 for inputting an operational signal by key input (or touch input), and a touch input unit 164 attached to the display unit 150 (i.e., an LC panel).

The key input unit 162 is configured to include control keys for controlling the operation of the mobile communication terminal 100 and a plurality of alphanumeric keys (not shown) for inputting characters and numbers.

The touch input unit 164 generates an input signal from a voltage signal, a current signal and the like depending on the positions where a contact occurs and outputs the signal to the controller 190.

When the touch input unit 164 is implemented by a touch panel, it is configured to include upper and lower plates formed of indium-tin-oxide (ITO) electrode layers or polyethyleneterephthalate (PET) films, electrode patterns formed on the electrode layers, and a space placed between the upper and lower plates for maintaining a certain gap therebetween. In this case, the ITO electrode layer forms a conductive X-axis pattern and a conductive Y-axis pattern at the edges thereof, in which the X-axis pattern and the Y-axis pattern are separated by an insulator. When a user presses the upper plate with their finger, the ITO electrode layer of the upper plate contacts the ITO electrode layer of the lower plate. Therefore, a voltage can be read through the X-axis pattern and the Y-axis pattern to thus extract the coordinate of the pressured point. The extracted coordinate is output to the controller 190.

The storage unit 170 stores an application program for controlling the operations of the mobile communication terminal according to an exemplary embodiment of the present invention, downloaded contents, and data generated by the user which is referred as user data. The storage unit 170 includes a program area and a data area.

The program area stores an operating system (OS) for booting the mobile communication terminal 100, and application programs necessary for other optional functions of the mobile communication terminal 100, for example, a music playback function, and an image or moving image playback function. If the respective functions are activated in response to a user request, the application programs run to provide their functions under the control of the controller 190. Also, the storage unit 170 is configured to include at least one or more buffers that temporarily store user data (e.g., music files, still images, etc.) generated when the applications for playback of music or moving images run.

The data area refers to an area in which user data, generated as the mobile communication terminal 100 is used, is stored.

More particularly, the data area stores a variety of data files including contents (e.g., music files, moving image files, etc.).

The controller 190 controls the entire operation of the mobile communication terminal 100 including signal flows between the blocks in the mobile communication terminal 100, such as the wireless communication unit 130, audio processing unit 140, display unit 150, input unit 160, and storage unit 170.

The controller 190 performs the respective functions of the mobile communication terminal 100 according to signals input through the input unit 160 and thus allows the display unit 150 to display a variety of information, such as a current state, a user menu, etc.

The following is a description of a touch input method of the mobile communication terminal 100 constructed as described above.

When a user touches the mobile communication terminal (which is referred to as a touch event), the touch input unit 164 outputs a coordinate of the touch event to the controller 190. That is, the touch input unit 164 detects a signal corresponding to the position (including one coordinate and a coordinate trace) where the touch event has occurred and outputs the corresponding coordinate to the controller 190. The controller 190 performs a function corresponding to the coordinate where the touch event has occurred. Also, the touch input unit 164 detects a period of time that the corresponding coordinate is continuously touched or pressed and outputs this information to the controller 190. The controller 190 performs a function of an event corresponding to the time period. That is, the controller 190 can perform respective functions according to a location and a time period when the touch panel 164 is pressed. The touch event may include a clicking, a dragging, etc. In particular, the clicking can be classified into a long keying where a signal is input for a relatively long time period and a short keying where a signal is input for a relatively short time period.

In accordance with an exemplary embodiment of the present invention, the controller 190 displays a virtual keyboard through the display unit 150.

Figure 2:
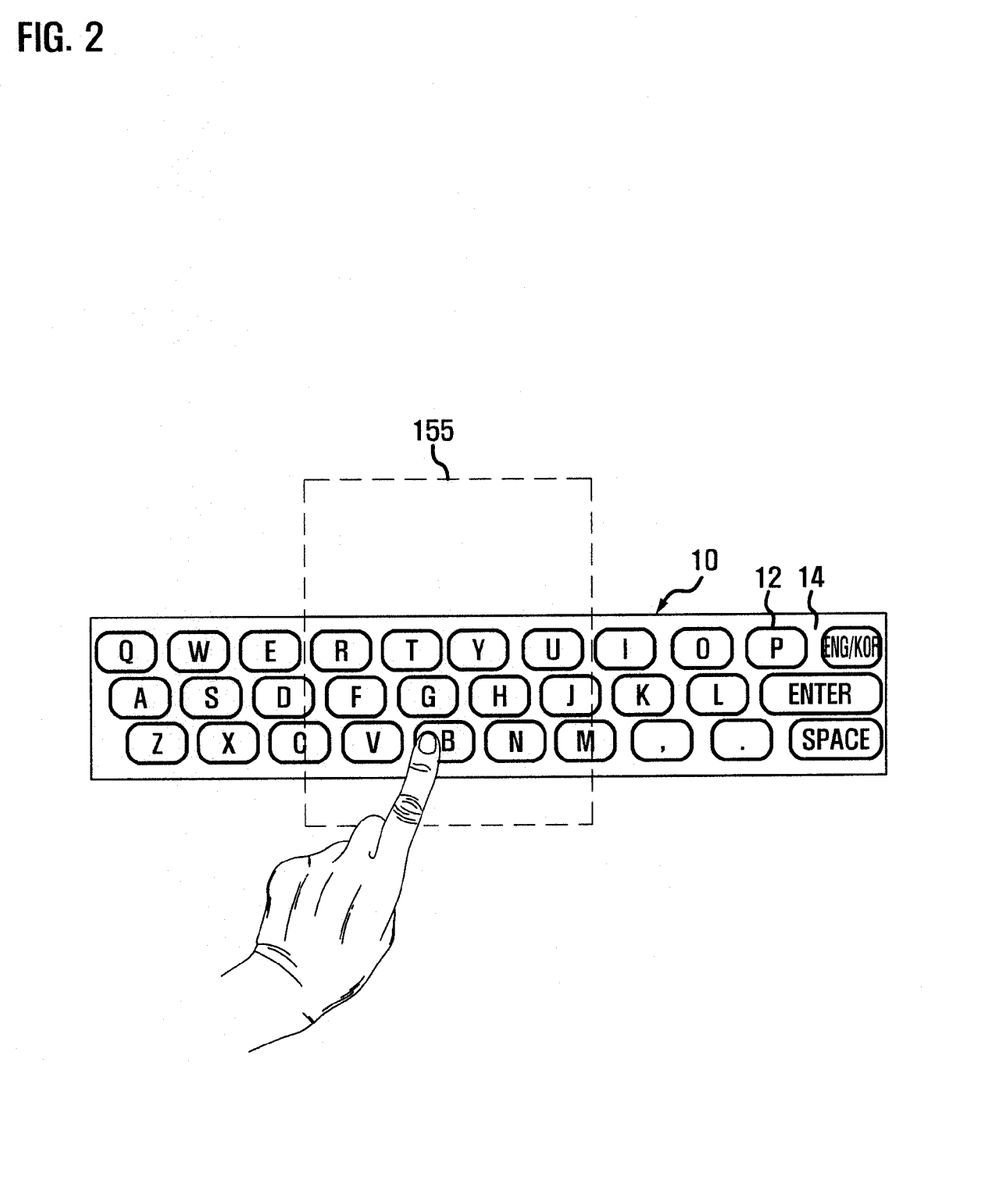
FIG. 2 is a view illustrating a virtual keyboard according to an exemplary embodiment of the present invention.

FIG. 2 is a view illustrating a virtual keyboard according to an exemplary embodiment of the present invention, which will be described in greater detail below.

The virtual keyboard 10 includes a plurality of keyboard keys 12 and blank areas 14 which are spaces between the keyboard keys. It should be understood that the virtual keyboard of the present invention can be implemented by only the keyboard keys 12 without the blank areas 14.

For a more concise description of an exemplary embodiment of the present invention, the display unit 150 to which the touch input unit 164 is attached is hereinafter referred as a touch screen 155.

The keyboard keys 12 of the virtual keyboard 10 according to an exemplary embodiment of the present invention are arrayed in the same manner as the conventional QWERTY keyboard, so that users can easily access the virtual keyboard 10. Also, the virtual keyboard 10 is displayed in a two-dimensional plane, in which the keyboard keys 12 are the same ratio in size as the conventional QWERTY keyboard keys. However, it should be understood that the keyboard keys of an exemplary embodiment of the present invention can be displayed in a variety of three dimensional shapes, which will be described later. In this case, the touch screen of these modified virtual keyboards 10 is displayed having a size less than the size of virtual keyboard 10 as illustrated in FIG. 2. In this case, the touch screen 155 cannot display all keyboard keys 12 and instead displays only a part of keyboard keys 12 (for example, 12 keys). Therefore, in order to use keyboard keys 12 not shown on the screen, the user moves the virtual keyboard 10 so that the desired keyboard keys can be shown on the touch screen 155.

Although the exemplary embodiment shown in FIG. 2 is implemented in such a way that all keyboard keys 12 move with a movement of the virtual keyboard 10, it should be understood that the exemplary embodiment can be modified in such a way that frequently used control keys (for example, an enter key, a space key, and a KR/EN key) can be always shown on the touch screen 155 regardless of the virtual keyboard 10.

Also, the controller 190 according to an exemplary embodiment of the present invention inputs characters according to input signals input through the touch screen 155. To this end, the controller 190 includes a character input unit that has a key input determining unit 192 and a keyboard processing unit 194.

The key input determining unit 192 receives an input signal input through the touch screen 155, determines whether the input signal is a character input signal or a virtual keyboard movement signal, and then informs the keyboard processing unit 194 of the determination. In an exemplary embodiment of the present invention, the key input determining unit 192 determines that an input signal is a character input signal if the input signal is generated from a click signal (or by a short keying). Also, the key input determining unit 192 determines that an input signal is a virtual keyboard movement signal if the input signal is generated from a drag signal. In the meantime, although the input signals are input on the keyboard keys 12 in an exemplary embodiment of the present invention, if a corresponding input signal is generated by a dragging motion, it is determined as a virtual keyboard movement signal. It is understood that the present invention is not limited by the exemplary embodiments, but rather modified to various modifications. For example, in order to more precisely determine an input signal, an exemplary configuration of the present invention can be implemented in such a way that an input signal is determined to be a virtual keyboard movement signal only if the input signal is generated as a dragging motion that starts only from the blank areas 14.

The keyboard processing unit 194 displays the virtual keyboard 10 on the touch screen 155 in response to the character input request. As described above, the touch screen 155 displays only a part of the virtual keyboard 10. Also, the keyboard processing unit 194 shifts the virtual keyboard 10 or inputs characters, according to signals that are output from the key input determining unit 192.

The character input method of the mobile communication terminal 100, according to an exemplary embodiment of the present invention, will be described in detail below. From the character input method, the configurations of the mobile communication terminal 100 and the apparatus for inputting characters become more apparent.

Figure 3:
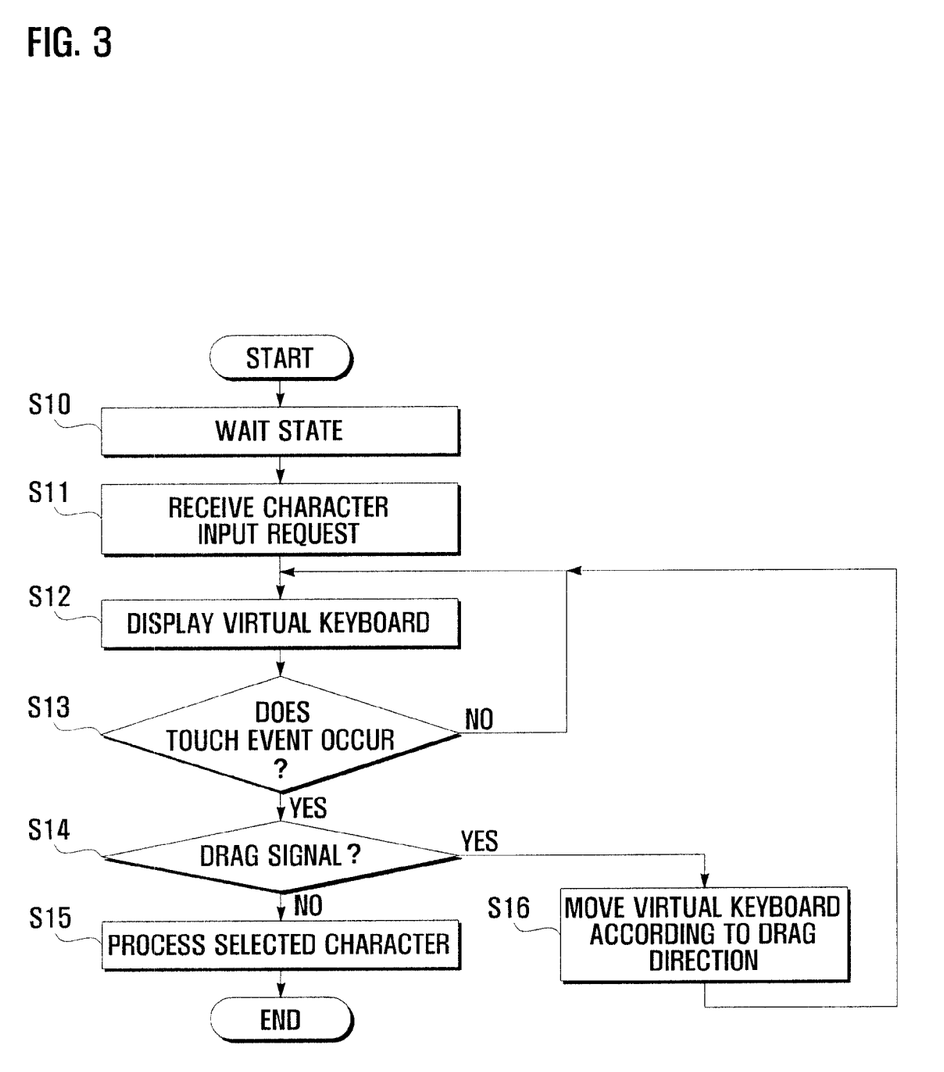
FIG. 3 is a flowchart illustrating a method for inputting characters in a mobile communication terminal, according to an exemplary embodiment of the present invention.

FIG. 3 is a flowchart illustrating a method for inputting characters in a mobile communication terminal, according to an exemplary embodiment of the present invention. FIGS. 4A to 4D are screens illustrating a virtual keyboard according to an exemplary embodiment of the present invention.

Referring to FIGS. 1 to 4D, when the mobile communication terminal 100 is turned on, it enters into an idle state where the display unit 150 displays a wait screen at step S10.

Figure 4A:
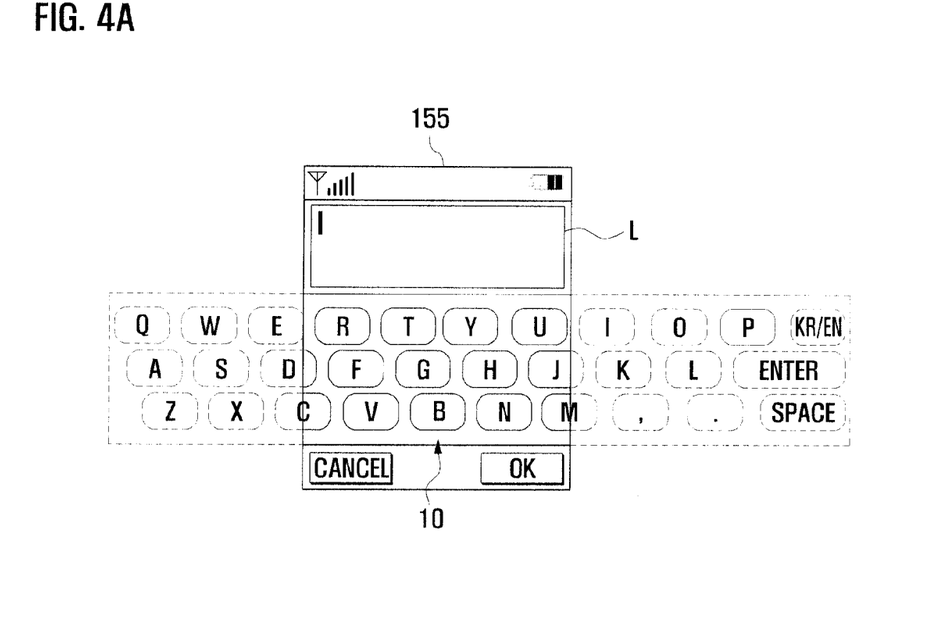
FIGS. 4A to 4D are screens illustrating a virtual keyboard according to an exemplary embodiment of the present invention.

When a user inputs a character input request through the input unit 160, the controller 190 reads the request from the input unit 160 at step S11. The controller 190, as shown in FIG. 4A, displays a virtual keyboard 10 on the touch screen 155 of the display unit 150 at step S12. As shown in FIG. 4A, the touch screen 155 includes a virtual keyboard 10, and an input portion L for displaying characters input through the virtual keyboard 10.

After that, the input signals are detected and input through the touch screen 155 at step S13. When the user touches the virtual keyboard 10 on the touch screen 155 using either their finger or a stylus pen, the controller 190 detects that a touch event has occurred. If a touch event does not occur, the controller 190 returns to step S12.

After a touch event has occurred on the virtual keyboard 10, the key input determining unit 192 of the character input apparatus determines whether the touch event corresponds to a character input signal or a virtual keyboard movement signal at step S14.

Figure 4B:
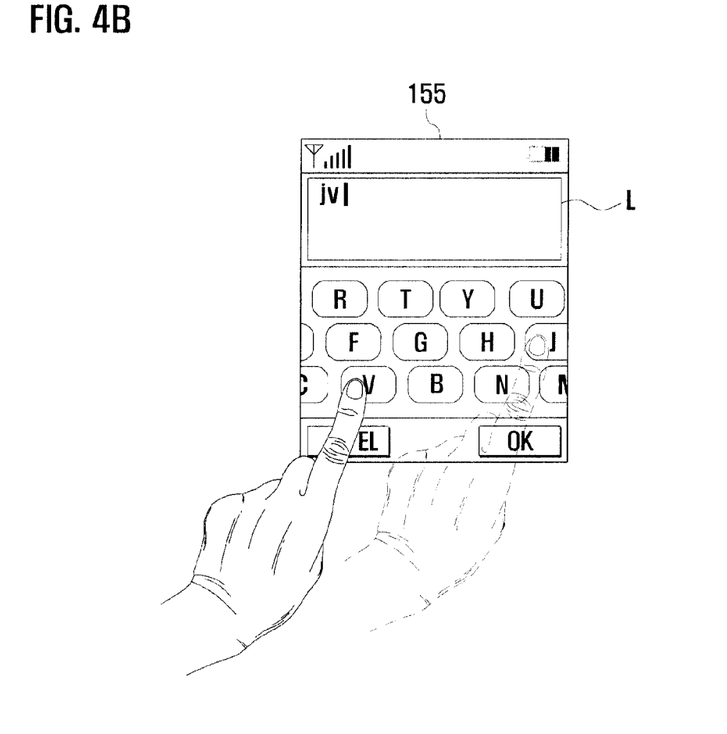

Referring to FIG. 4B, if the input touch event corresponds to a click signal, or a character input signal, the key input determining unit 192 informs the keyboard processing unit 194 that a character input signal is input. The keyboard processing unit 194 then displays the characters selected by the touch event on the input portion L at step S15.

In contrast, if the input touch event corresponds to a drag signal, the key input determining unit 192 informs the keyboard processing unit 194 that the virtual keyboard movement signal is input from the user.

Figure 4C:
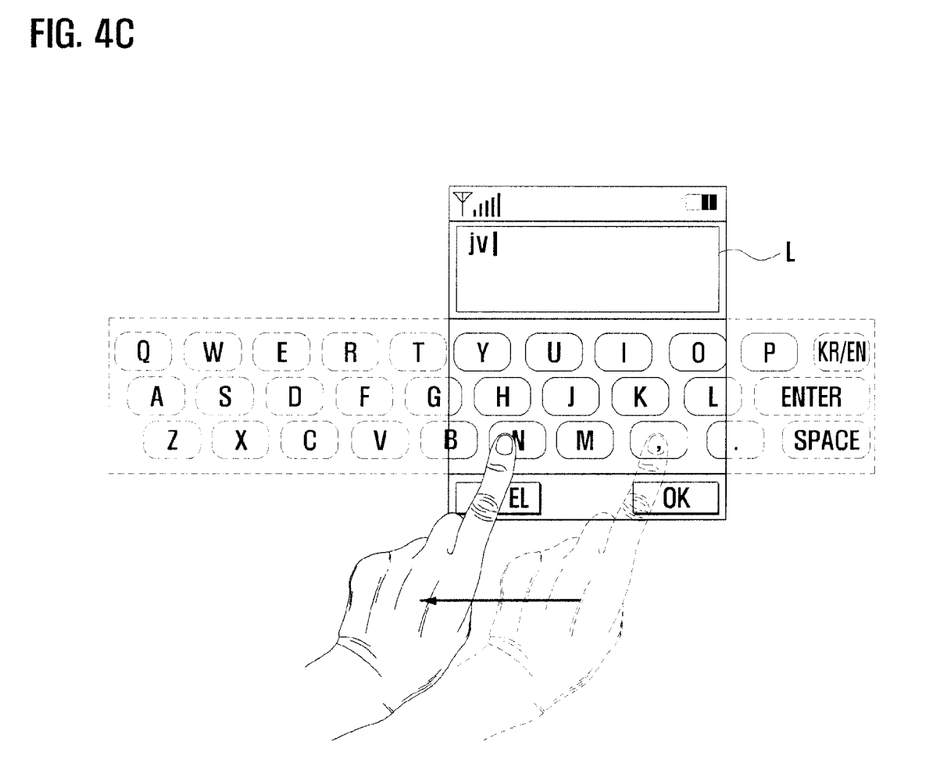

The keyboard processing unit 194 moves and displays the virtual keyboard 10 based on the direction, speed, and distance of the drag motion at step S16. The keyboard processing unit 194 continues to move the virtual keyboard 10 until the user stops inputting the drag signal. Through this process, the hidden portion of the virtual keyboard 10 can be displayed on the touch screen 155, as shown in FIG. 4C.

Figure 4D:
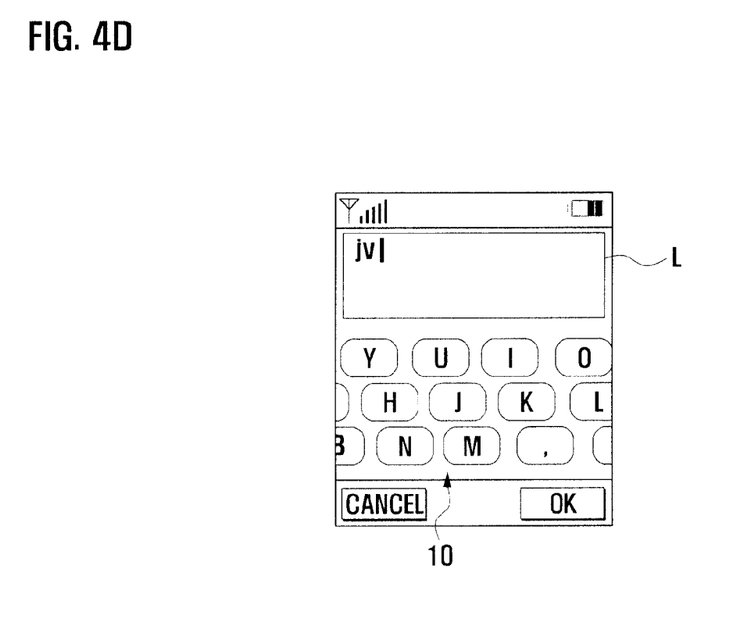

In contrast, if the drag signal is stopped, the keyboard processing unit 194 stops moving the virtual keyboard 10. Therefore, as shown in FIG. 4D, the touch screen 155 continuously displays a portion of the virtual keyboard 10 at the time when the drag signal is stopped.

After completing the movement of the virtual keyboard 10, the keyboard processing unit 194 displays the presently moved and displayed virtual keyboard 10 on the touch screen 155 at step S12. After that, the procedure repeats from step S12 to step S16 as described above, while waiting for a user input.

As described above, the mobile communication terminal inputs characters through the virtual keyboard 10 which is larger in size than the touch screen 155. Since the keyboard keys 12 are displayed prominently on the touch screen, the present invention can reduce the rate of touch errors (users mistakenly touching keys other then the desired keys). Also, since the virtual keyboard 10 has the same keyboard key array as the conventional QWERTY keyboard and displays the keys prominently, it is user-friendly.

In the meantime, it should be understood that the virtual keyboard 10 of the present invention is not limited to a two-dimensional display. The virtual keyboard 10 can be displayed in a variety of forms. A virtual keyboard according to another exemplary embodiment of the present invention will be described in detail below.

FIGS. 5A to 5D are screens illustrating a virtual keyboard according to another exemplary embodiment of the present invention.

Figure 5A:
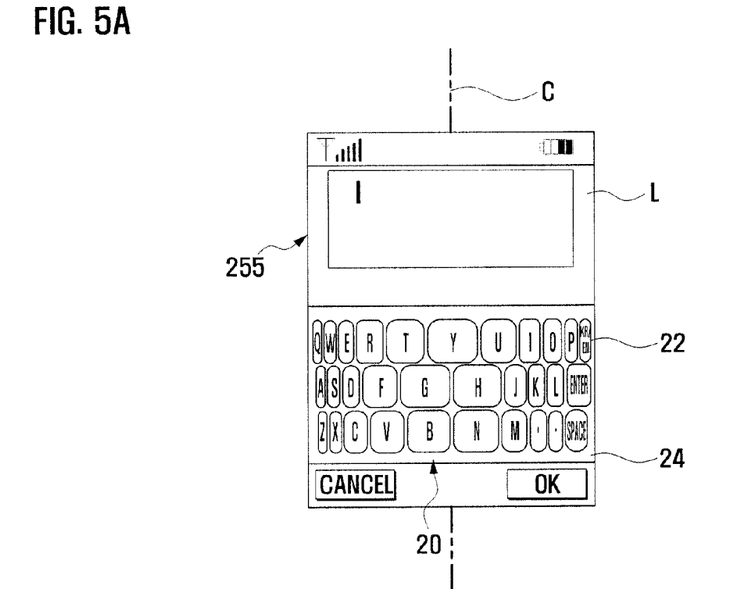
FIGS. 5A to 5D are screens illustrating a virtual keyboard according to another exemplary embodiment of the present invention.

Referring to FIG. 5A, the virtual keyboard 20 is configured as a cylindrical form and thus displays all the keyboard keys 22 simultaneously on a touch screen 255, which differs from the previous exemplary embodiment shown in FIGS. 4A to 4D. The virtual keyboard 20 is configured to include a plurality of keyboard keys 22, and blank areas 24 that are spaces between the keyboard keys 22. It should be understood that the virtual keyboard 20 of an exemplary embodiment of the present invention can be implemented by only the keyboard keys 22 without the blank areas 24.

In another exemplary embodiment of the present invention, the keyboard keys 22 of the virtual keyboard 20 are displayed in different sizes on the touch screen 255. Specifically, the more prominently displayed keyboard keys 22 are located at the center of the touch screen 255 and the smaller displayed keyboard keys 22 are located at both sides of the touch screen 255. That is, the virtual keyboard 20 is displayed three-dimensionally in perspective.

When the virtual keyboard 20 inputs a virtual keyboard movement signal, it rotates to be displayed with respect to the central virtual axis C of the cylindrical form. Therefore, the keyboard keys 22 are displayed with rotation. That is, the keyboard keys 22 change their positions and displayed sizes, with respect to the center of the touch screen, with rotation of the virtual keyboard 22.

Figure 5B:
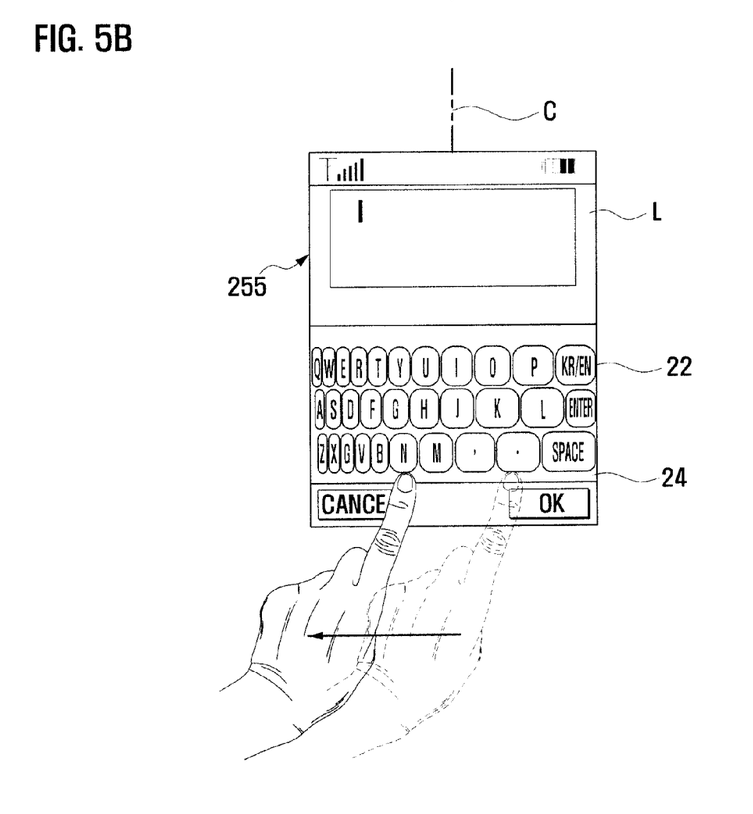

In another exemplary embodiment of the present invention, as shown in FIG. 5B, the keyboard processing unit 194 of FIG. 1 displays the keyboard keys 22, which are presently located on the center of the touch screen as having a relatively large size. That is, the keyboard keys 22 located at the center portion of the touch screen 255 are magnified and displayed. Therefore, although the virtual keyboard 20 is rotated according to the virtual keyboard movement signal, the keyboard keys 22 are always displayed and rotated at a relatively large size in the center portion of the touch screen 255, as shown in FIG. 5B.

Figure 5C:
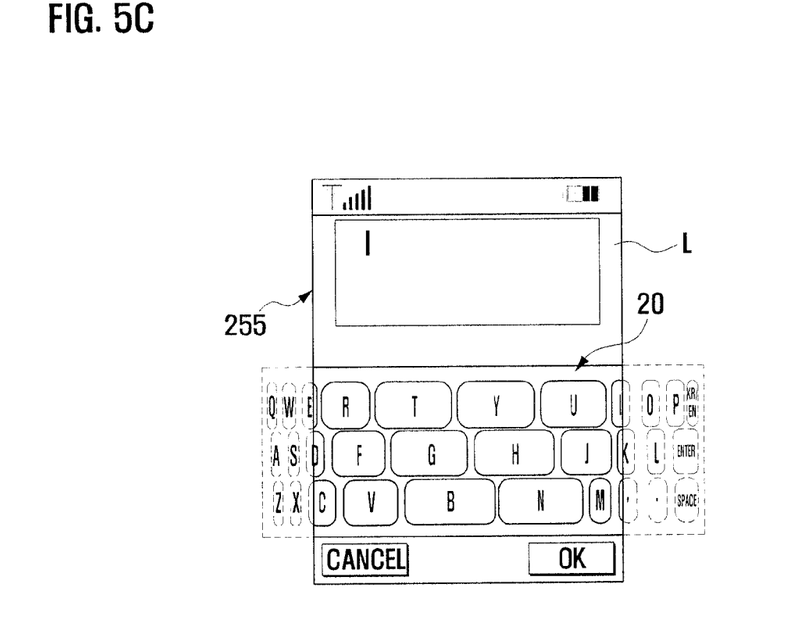

In accordance with a further exemplary embodiment of the present invention, the virtual keyboard can be modified as shown in FIG. 5C. That is, as shown in FIG. 5C, the virtual keyboard 20 is implemented as a three-dimensional form and displays a part of keyboard keys of which the majority are magnified on the touch screen.

Figure 5D:
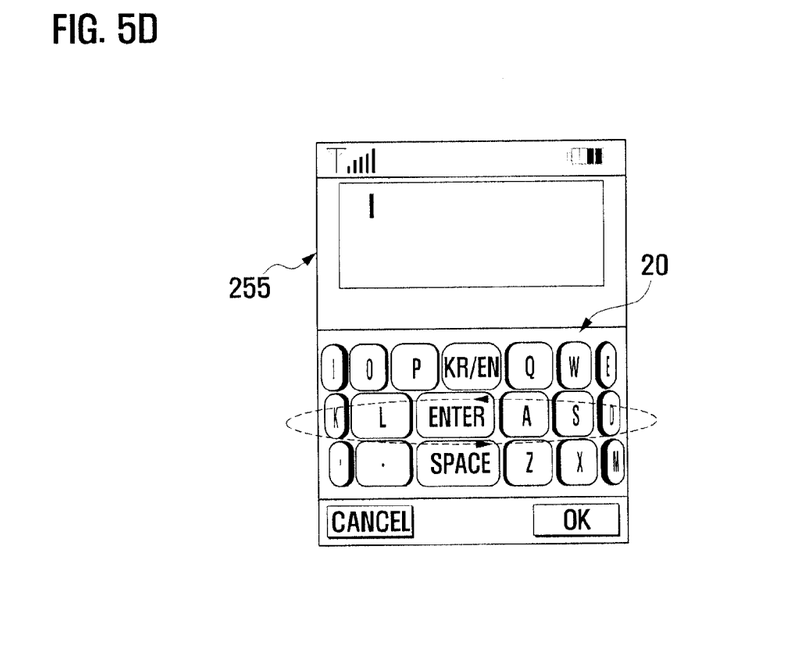

Additionally, the virtual keyboard 20 can be modified according to an exemplary embodiment shown in FIG. 5D. That is, the virtual keyboard 20 of FIG. 5D is implemented as a circular band, so that the keyboard keys located at opposite sides in the same row (e.g., the enter key and the A key) can be adjacently located. Therefore, if the virtual keyboard 20 of FIG. 5D makes a turn, the same keyboard keys are displayed on the touch screen.

As described above, since the virtual keyboard according to an exemplary embodiment of the present invention is implemented to be displayed three-dimensionally on the touch screen, users can easily and enjoyably input their desired characters through the magnified keyboard keys displayed on the touch screen.

The character input method and apparatus, according to an exemplary embodiment of the present invention, allows users to input characters through a virtual keyboard that is larger than the touch screen, or though the keyboard keys magnified and displayed on the touch screen, so that the users can easily input their desired characters. Accordingly, the present invention can reduce user's character input errors.

Although the virtual keyboard, according to exemplary embodiments of the present invention, has the same keyboard key array as the QWERTY keyboard, it will be appreciated that the present invention is not limited thereto, but may be modified in such a way that the keyboard keys may be arranged in two or four rows. Also, although the virtual keyboard is implemented in such a way to move or rotate from side to side, it will be appreciated that the keyboard key may move or rotate up and down.

Additionally, although the character input method and apparatus according to exemplary embodiments of the present invention are described based on a mobile communication terminal, it will be appreciated that they can be applied to various electronic devices provided that the devices have a touch screen and are able to input a user's input signal through a virtual keyboard on the touch screen.

Furthermore, since the character input method and apparatus of a mobile communication terminal, according to exemplary embodiments of the present invention, use a virtual keyboard having a size that is greater than the touch screen attached thereto and this magnifies and displays the keyboard keys on the touch screen, users can easily input their desired characters. Also, the character input method and apparatus can reduce the user's character input errors, therefore the users can reduce their character input time.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with respect to certain exemplary embodiments thereof, it will be understood by those skilled in the art that many variations and modifications of the basic inventive concept herein described may be made therein without departing from the spirit and scope of the invention as defined by the appended claims and their equivalents.

What is claimed is:

1. A method for displaying a keyboard and receiving an input through a touch screen in a mobile communication terminal, the method comprising:
    displaying a virtual keyboard having a first orientation on the touch screen, wherein, in the first orientation, a first plurality of keys of the virtual keyboard displayed near the center of the touch screen are displayed more prominently than keys displayed away from the center of the touch screen;
    displaying an input portion on the touch screen;
    detecting an input signal on the displayed virtual keyboard having the first orientation;
    displaying a character corresponding to the input signal in the input portion when the detected input signal is a touch and release signal; and
    moving the keys in the displayed virtual keyboard to have a second orientation on the touch screen when the detected input signal is a touch and drag signal,
    wherein, in the second orientation, a second plurality of keys of the virtual keyboard displayed near the center of the touch screen are displayed more prominently than keys displayed away from the center of the touch screen, and wherein the second plurality of keys is different from but not entirely exclusive of the first plurality of keys.

2. The method of claim 1, wherein the displaying of the virtual keyboard having the first orientation comprises displaying fewer than all keys of the virtual keyboard on the touch screen.

3. The method of claim 2, wherein the displaying of the virtual keyboard having the second orientation comprises displaying fewer than all keys of the virtual keyboard on the touch screen.

4. The method of claim 1, wherein the displaying of the virtual keyboard having the first orientation comprises displaying all keys of the virtual keyboard on the touch screen.

5. The method of claim 4, wherein the displaying of the virtual keyboard having the second orientation comprises displaying all keys of the virtual keyboard on the touch screen.

6. The method of claim 1, wherein the virtual keyboard comprises blank areas which are spaces between the keys.

7. The method of claim 1, wherein the virtual keyboard comprises a QWERTY keyboard.

8. The method of claim 1, wherein the displaying of the virtual keyboard having the first orientation comprises displaying the virtual keyboard having a cylindrical shape such that each key of the virtual keyboard is displayed having smaller size as compared to the other keys of the virtual keyboard as its distance from the center of the touch screen increases.

9. The method of claim 8, wherein the displaying of the virtual keyboard having the second orientation comprises displaying the virtual keyboard having a cylindrical shape such that each key of the virtual keyboard is displayed having smaller size as compared to the other keys of the virtual keyboard as its distance from the center of the touch screen increases.

10. An apparatus for displaying a keyboard and receiving an input through a touch screen in a mobile communication terminal, the apparatus comprising:
    a storage unit;
    a key input determining unit configured to detect an input signal on a displayed virtual keyboard having a first orientation; and
    a keyboard processing unit configured to display the virtual keyboard having the first orientation on the touch screen, wherein, in the first orientation, a first plurality of keys of the virtual keyboard displayed near the center of the touch screen are displayed more prominently than keys displayed away from the center of the touch screen, to display an input portion on the touch screen, to display a character corresponding to the input signal in the input portion when the detected input signal is a touch and release signal, and to move the keys in the displayed virtual keyboard to have a second orientation on the touch screen when the detected input signal is a touch and drag signal,
    wherein, in the second orientation, a second plurality of keys of the virtual keyboard displayed near the center of the touch screen are displayed more prominently than keys displayed away from the center of the touch screen, and wherein the second plurality of keys is different from but not entirely exclusive of the first plurality of keys.

11. The apparatus of claim 10, wherein the keyboard processing unit is further configured to display the virtual keyboard having the first orientation by displaying fewer than all keys of the virtual keyboard on the touch screen.

12. The apparatus of claim 11, wherein the keyboard processing unit is further configured to display the virtual keyboard having the second orientation by displaying fewer than all keys of the virtual keyboard on the touch screen.

13. The apparatus of claim 10, wherein the keyboard processing unit is further configured to display the virtual keyboard having the first orientation by displaying all keys of the virtual keyboard on the touch screen.

14. The apparatus of claim 13, wherein the keyboard processing unit is further configured to display the virtual keyboard having the second orientation by displaying all keys of the virtual keyboard on the touch screen.

15. The apparatus of claim 10, wherein the virtual keyboard comprises blank areas which are spaces between the keys.

16. The apparatus of claim 10, wherein the virtual keyboard comprises a QWERTY keyboard.

17. The apparatus of claim 10, wherein the keyboard processing unit is further configured to display the virtual keyboard having the first orientation by displaying the virtual keyboard having a cylindrical shape such that each key of the virtual keyboard is displayed having smaller size as compared to the other keys of the virtual keyboard as its distance from the center of the touch screen increases.

18. The apparatus of claim 17, wherein the keyboard processing unit is further configured to display the virtual keyboard having the second orientation by displaying the virtual keyboard having a cylindrical shape such that each key of the virtual keyboard is displayed having smaller size as compared to the other keys of the virtual keyboard as its distance from the center of the touch screen increases.

* * * * *